United States Patent
Messadi et al.

(10) Patent No.: US 12,091,103 B2
(45) Date of Patent: Sep. 17, 2024

(54) BELT PULLEY AND STEERING GEAR

(71) Applicant: ZF Automotive Germany GmbH, Alfdorf (DE)

(72) Inventors: Mohamed Messadi, Düsseldorf (DE); Christian Gollasch, Voerde (DE); Sedat Kirli, Essen (DE)

(73) Assignee: ZF Automotive Germany GMBH, Alfdorf (DE)

( * ) Notice: Subject to any disclaimer, the term of this patent is extended or adjusted under 35 U.S.C. 154(b) by 483 days.

(21) Appl. No.: 17/313,440

(22) Filed: May 6, 2021

(65) Prior Publication Data
US 2021/0354747 A1    Nov. 18, 2021

(30) Foreign Application Priority Data
May 12, 2020   (DE) .......................... 102020205971.3

(51) Int. Cl.
*F16H 7/02* (2006.01)
*B62D 5/04* (2006.01)

(52) U.S. Cl.
CPC ......... *B62D 5/0445* (2013.01); *B62D 5/0424* (2013.01); *F16H 7/023* (2013.01)

(58) Field of Classification Search
CPC ..... F16H 2007/0863; F16H 2007/0865; F16H 7/20
See application file for complete search history.

(56) References Cited

U.S. PATENT DOCUMENTS

| | | | | |
|---|---|---|---|---|
| 6,485,180 B2 * | 11/2002 | Mena | ...................... | F16C 33/20 384/38 |
| 7,665,747 B2 * | 2/2010 | Arlt | .......................... | B62D 3/12 384/296 |
| 8,016,685 B2 * | 9/2011 | Kurosu | ................... | F16D 7/046 464/38 |
| 8,307,940 B2 * | 11/2012 | Bugosh | ................. | F16C 27/066 180/443 |
| 8,784,244 B2 * | 7/2014 | Lannutti | ................. | F16D 13/76 192/113.32 |
| 8,997,597 B2 * | 4/2015 | Rupp | ....................... | B62D 3/06 74/388 PS |
| 9,958,050 B2 * | 5/2018 | Kolloch | .................. | F16H 55/48 |
| 10,508,719 B2 * | 12/2019 | Lee | ......................... | F16H 39/00 |
| 2018/0163788 A1 * | 6/2018 | Dell | ........................ | F16H 55/36 |
| 2018/0281843 A1 * | 10/2018 | Asakura | .................. | F16H 7/023 |
| 2019/0047612 A1 * | 2/2019 | Lee | ...................... | B62D 5/0448 |
| 2020/0088271 A1 * | 3/2020 | Wade | ....................... | F16H 55/52 |
| 2021/0188564 A1 * | 6/2021 | Rutkevicius | ........... | B65G 39/02 |

FOREIGN PATENT DOCUMENTS

CN          201306434 Y  *  9/2009

* cited by examiner

*Primary Examiner* — Bobby Rushing, Jr.
(74) *Attorney, Agent, or Firm* — Kristin L. Murphy

(57) ABSTRACT

A belt pulley (28) for a gear mechanism has a hollow cylindrical body (36) and a disc-like fixing flange (42) which is molded onto an axial end of the body (36), protrudes radially inward, and has a central cutout (44). The fixing flange (42) has at least one first contact face (60) on its inside and the body (36) has at least one second contact face (64) on an inside. The first contact face (60) and the second contact face (64) are offset to each other in the circumferential direction relative to a central axis of the body (36). A steering gear for a vehicle is also disclosed, wherein the steering gear comprises a belt pulley (28).

18 Claims, 4 Drawing Sheets

BELT PULLEY AND STEERING GEAR

RELATED APPLICATIONS

The present invention claims priority from 102020205971.3, filed 12 May 2020, the entirety of which is incorporated herein by reference.

BACKGROUND OF THE INVENTION

The invention concerns a belt pulley for a gear mechanism and a steering gear for a motor vehicle.

In order to keep the rotating masses of gear mechanisms low, it is known to make the rotating masses from lightweight materials; for example, belt pulleys made of plastic are used. The belt pulleys are then attached to a mounting flange of a threaded nut of the gear mechanism by means of fixing bolts. The fixing forces of the bolts generate material stresses in the belt pulley and these forces may lead to damage to the belt pulley.

To avoid such damage and absorb the fixing forces of the fixing bolts, bodies made of plastic are normally reinforced in targeted fashion with metal inserts at specific locations. For this, the metal inserts are laid in the mold before injection-molding of the belt pulley, or later placed on the body and molded in so that an at least two-stage production process is required.

SUMMARY OF THE INVENTION

It is therefore an object of the invention to create a robust belt pulley which is simple to produce.

To achieve this object, a belt pulley is provided for a gear mechanism which has a hollow cylindrical body and a disc-like fixing flange which is molded onto an axial end of the body and protrudes radially inward. The fixing flange has a central cutout and a first contact face on its inside. The body has at least one second contact face on an inside. The first contact face and the second contact face are offset to each other in the circumferential direction relative to a central axis of the body.

The basic concept of the invention is to structure the geometry of the belt pulley such that reinforcements from metal inserts in the belt pulley are superfluous. The contact faces offset in the circumferential direction then allow the forces occurring from the fixing of the belt pulley to be introduced into different regions of the belt pulley. Thus only the molding tool for the belt pulley must be designed according to the geometry.

In particular, the belt pulley has no material inserts so the production process is simplified.

The contact face is the face on which a part of the gear mechanism, for example a threaded nut, bears on the belt pulley.

The belt pulley may be made from a duroplastic material, for example a phenolic resin. These plastics are also known as duromers.

In one aspect of the invention, viewed in the axial direction, all first contact faces and all second contact faces lie in different circumferential segments which do not overlap. Thus in each circumferential segment, a contact face is provided in precisely one direction and the belt pulley has a degree of elasticity between the contact faces and perpendicularly to the contact direction. In this way, the stresses occurring are distributed better in the belt pulley.

This circumferential segments may be evenly distributed in the circumferential direction.

The at least one second contact face, or all second contact faces in the case of several second contact faces, may stand perpendicularly to a plane in which the at least one contact face, or all first contact faces in the case of several first contact faces, lies or lie. In this way, a belt pulley is provided which can be applied onto a cylindrical threaded nut in a simple fashion with optimized positioning.

In one embodiment of the invention, the at least one second contact face is a cylinder surface portion and runs parallel to a cylindrical inner casing surface of the body. This allows a portioned contacting of the threaded nut on the hollow cylindrical body.

The at least one first and/or at least one second contact face may be raised relative to adjacent faces.

In other words, the first and/or second contact face is/are formed on a corresponding protrusion, which allows simple structural provision of the contact face or contact faces. Also, these raised faces achieve a secure contact and the forces introduced into the contact faces may propagate into the adjacent wall portions, ensuring a distribution of stresses.

It may be provided that the at least one second contact face is present on a step-like molded-on extension of a cylindrical inner casing surface of the body. In this way, a degree of elasticity of the belt pulley is provided between the extensions where the force is introduced, and vibrations occurring may be compensated.

To guarantee a high stability of the belt pulley, several first and several second contact faces may be present. Here the several first contact faces are spaced apart from one another and the several second contact faces are spaced apart from one another, in each case circumferentially. This also leads to stress distribution.

In an embodiment of the invention, several molded-on extensions are provided which are spaced apart from one another in the circumferential direction and have at least one second contact face. This allows a symmetrical distribution of the contact faces and hence a high stability of the belt pulley.

It is also conceivable that a molded-on extension has several second contact faces, for example two second contact faces.

The at least one extension may lie at the transition between the body and the fixing flange. A circumferential groove may be provided at the direct transition between the radial inside of the at least one extension and the fixing flange. The circumferential groove provides a degree of elasticity of the extension and the stresses at the transition are reduced.

In order to provide a belt pulley with an even wall thickness, on the end face of the fixing flange facing away from the body, in the region of the at least one extension, an axial cutout may be provided which extends into the extension.

In the case of several extensions, on the end face of the fixing flange in the region of each extension, an axial cutout may be provided which extends into the extension. This cutout ensures a smaller accumulation of material and a degree of flexibility.

At least one fixing opening may be provided on the fixing flange, and a protruding ring bead which surrounds the fixing opening may be provided on the end face of the fixing flange facing away from the body. Here, the ring bead ends in a contact face for a fixing means, wherein the circumferential face of the ring bead forms an outer face of a truncated cone. In this way, the fixing material of the ring bead and hence the fixing flange is compressed in one portion, i.e. the flange itself is less loaded with local stresses from the bolts. The forces of the bolt head may compress the conical ring and are evenly transmitted to the flange.

It may be provided that each fixing opening ends in a first contact face. In particular, a compression force is created between the respective first contact face and the corresponding ring bead, so that the belt pulley may be exposed to high fixing forces. Furthermore, in this region the wall thickness is particularly large so that the resistance to compression loading is high.

In one embodiment of the invention, the body has a toothing on the outer periphery. The belt pulley is thus a toothed belt pulley and allows efficient force transmission.

The object of the invention is also achieved by a steering gear for a vehicle. The steering gear has a threaded nut and a belt pulley of the type described above which is placed on the threaded nut and attached thereto. The threaded nut lies on the first and second contact faces which constitute the only contact points between the components. The advantages and features described in relation to the belt pulley also apply to the steering mechanism and vice versa.

In the case of several first contact faces and/or second contact faces, the threaded nut may preferably bear on all first and all second contact faces.

BRIEF DESCRIPTION OF THE DRAWINGS

Further advantages and features arise from the following description and the appended drawings to which reference is made below. The drawings show.

DESCRIPTION

Figure 1:
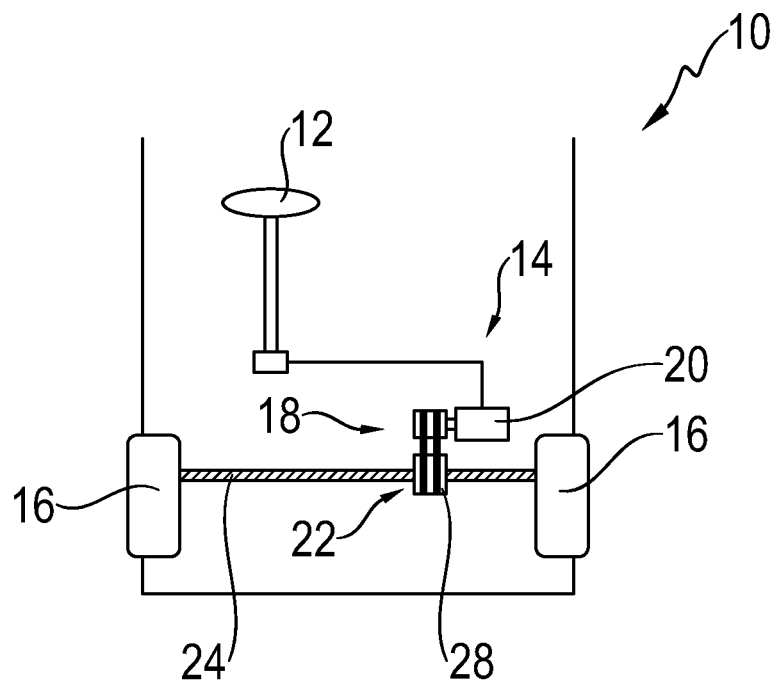
FIG. 1 a diagrammatic top view of a vehicle with a steering gear according to the invention, FIG. 2 a perspective exploded view of the steering gear according to the invention from FIG. 1, FIG. 3 an axial sectional view through the assembled steering gear from FIG. 1 in the region of a fixing opening, FIG. 4 a first embodiment of a belt pulley according to the invention of the steering gear from FIGS. 1 and 2 in a view from below, FIG. 5 a perspective sectional view along cut line V-V of FIG. 4, FIG. 6 a second embodiment of a belt pulley according to the invention in the perspective sectional view of FIG. 5, and FIG. 7 an axial sectional view through the belt pulley of FIG. 6 in the region of an axial extension.

FIG. 1 shows a diagrammatic top view of a part of a vehicle 10. The vehicle 10 has a steering wheel 12, a steering device 14 and wheels 16.

The steering device 14 comprises a toothed belt gear 18 which is driven on the drive side by an actuating motor 20. The actuating motor 20 receives an electronic steering signal and converts this into a rotation. On the output side, the toothed belt gear 18 is coupled to a steering gear 22. The steering gear 22 converts the rotational motion of the toothed belt gear 18 into a linear motion of an intermediate element 24 which is coupled to the wheels 16, whereby the vehicle 10 is steered.

Figure 2:
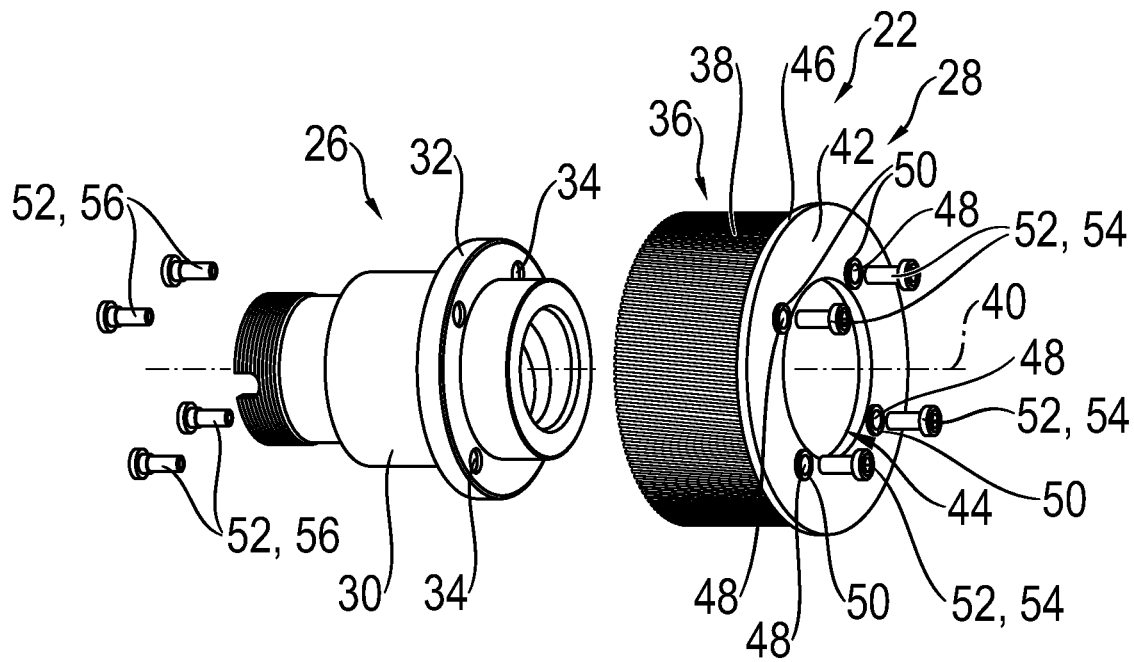

In the embodiment of FIG. 2, the steering gear 22 is a recirculating ball steering gear.

The steering gear 22 has a threaded nut 26 and belt pulley 28. The threaded nut 26 has a cylindrical base body 30 which is provided with a peripheral mounting flange 32. Several mounting openings 34 are provided in the mounting flange 32.

The belt pulley 28 is made integrally of plastic, for example a phenolic resin, and has a hollow cylindrical body 36 with toothing 38 on its outer face.

A radially inwardly protruding, disc-like fixing flange 42, which transforms integrally into the body 36, is provided on an end face of the cylindrical body 36, i.e. at an axial end relative to a central axis 40 of the body. The fixing flange 42 has a central cutout 44. The inner diameter of the fixing flange 42 is slightly larger than the outer diameter of the threaded nut 26 axially next to the mounting flange 32.

Towards the outside, the fixing flange 42 protrudes slightly over the toothing 38 and forms a circumferentially closed collar 46 which terminates flush with the body 36 in the axial direction.

In the region of the fixing flange 42 lying inside the cylindrical body 36, several fixing openings 48 are provided which correspond in orientation and number to the mounting openings 34 in the mounting flange 32 of the threaded nut 26.

On the outside of the fixing flange 42, i.e. on an end face of the fixing flange 42 facing away from the body 36, a molded-on ring bead 50 is provided at each fixing opening 48, which surrounds the respective fixing opening 48 and protrudes from the outside of the fixing flange 42.

To fix the belt pulley 28 to the threaded nut 26, several fixing means 52 are used which are here formed from threaded bolts 54 and threaded sleeves 56. These form a rotationally fixed connection between the belt pulley 28 and the threaded nut 26.

Figure 3:
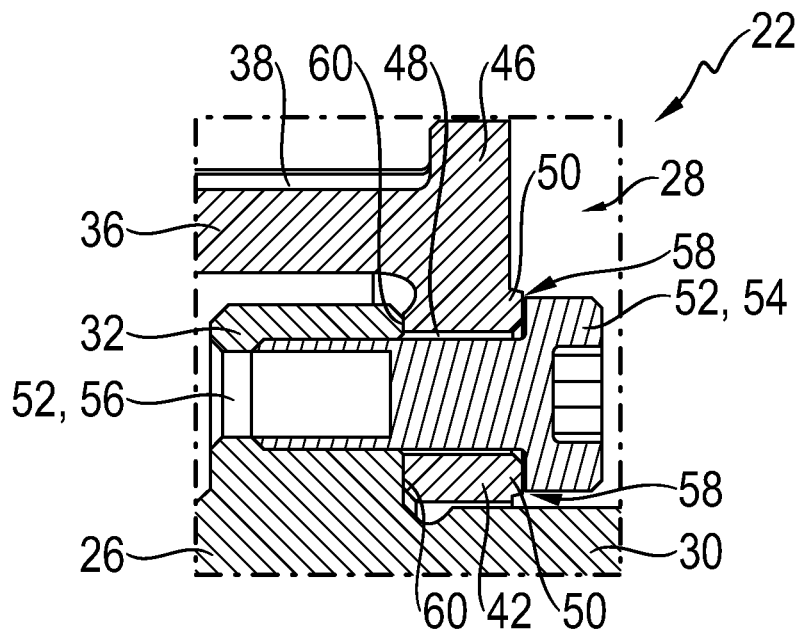

FIG. 3 shows a sectional view in the axial direction through the assembled steering gear 22 in the region of a fixing opening 48.

The ring bead 50 forms a contact face 58 for the threaded bolt 54, and the underside of a head of the threaded bolt 54 rests thereon. The ring bead 50 in cross-section has the form of a hollow truncated cone, wherein the contact face 58 is formed by the end face of the truncated cone with the smaller outer dimensions.

In the axial direction, each fixing opening 48 ends in an assigned first contact face 60 on an inside of the belt pulley 28, and in mounted state of the steering gear 22, the side of the mounting face 32 facing the fixing flange 42 bears axially thereon.

As shown in the view from below of the belt pulley 28 in FIG. 4, the fixing flange 42 has several first contact faces 60 on the inside. The first contact faces 60 are evenly spaced apart and distributed in the circumferential direction about the central axis 40, and are raised relative to adjacent faces on the inside of the fixing flange 42 (FIG. 5). Accordingly, the mounting flange 32 of the threaded nut 26 at the fixing flange 42 bears only on the first contact faces 60 and not on the faces of the inside of the fixing flange 42 between the first contact faces 60.

Step-like axial extensions 62 are molded onto an inner casing surface 61 of the body 36 adjacent to the first contact faces 60 in the circumferential direction and radially outwardly offset to the first contact faces 60. The axial extensions 62 are here arranged at the transition of the fixing flange 42 to the body 36.

Figure 4:
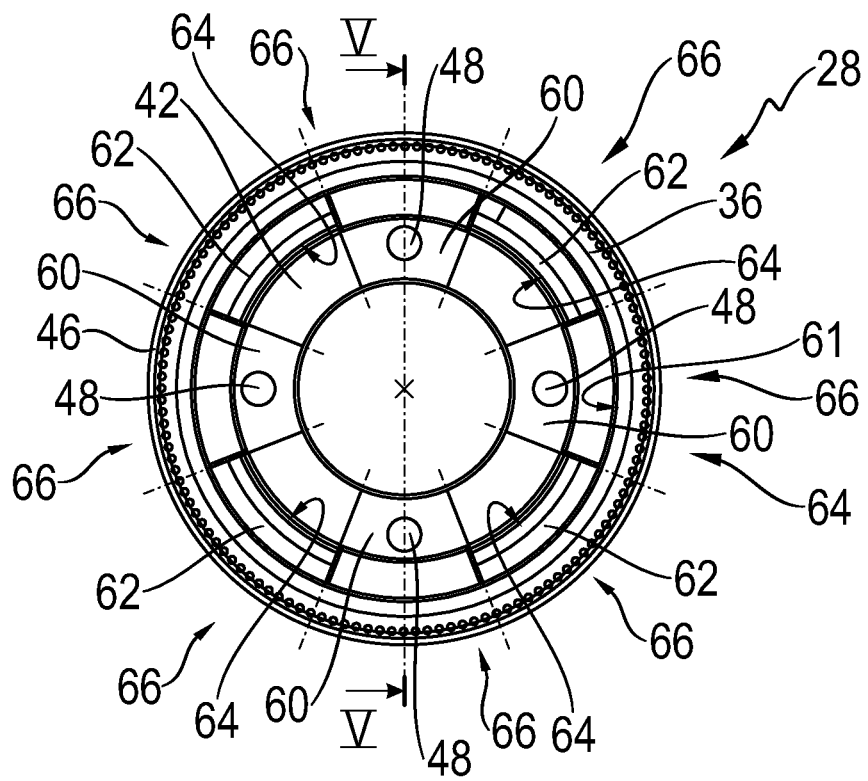
Figure 5:
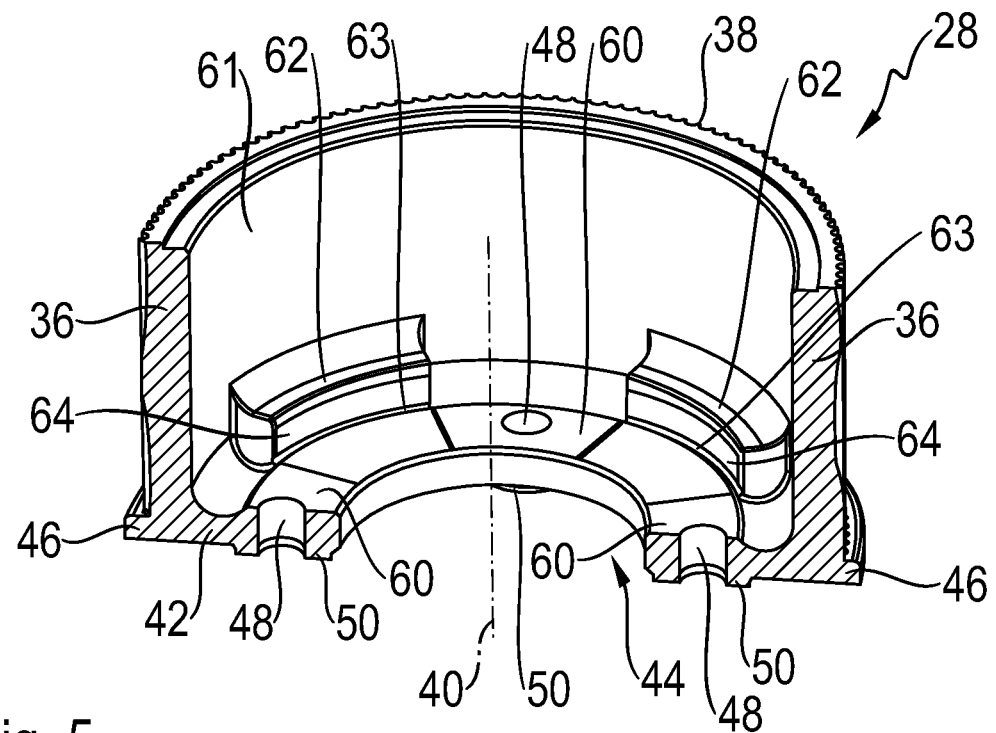

The extensions 62 are shown in detail in the perspective sectional view in FIG. 5, which shows a section through the belt pulley 28 along cut line V-V of FIG. 4. A respective circumferential groove 63 is formed at the direct transition of the fixing flange 42 to the axial extensions 62, i.e. a groove which extends in the circumferential direction relative to the central axis 40 of the belt pulley 28.

On a side of the extensions 62 facing the central axis 40, second contact faces 64 are provided which are arranged parallel to the otherwise circular cylindrical inner casing surface 61 of the body 36. The second contact faces 64 are thus formed by cylinder surface portions of the body 36.

In other words, the second contact faces 64 are arranged perpendicular to a radial plane in which the first contact faces 60 are arranged. Accordingly, the first and second contact faces 60, 64 stand perpendicularly to each other.

The second contact faces 64 are arranged offset in the circumferential direction and in the axial direction relative to the first contact faces 60.

More precisely, the first contact faces 60 and the second contact faces 64 are arranged in respective non-overlapping circumferential segments 66 (FIG. 4). The first contact faces 60 are spaced apart from one another, and the second contact faces 64 are spaced apart from one another, in each case in the circumferential direction.

The second contact faces 64 of the belt pulley 28 bear on a part of the gear mechanism. For example, the second contact faces 64 of the belt pulley 28 bear on the peripheral edge of the mounting flange 32 of the threaded nut 26 shown in FIG. 2.

The threaded nut 26 is thus attached to the belt pulley 28 by means of the first contact faces 60 and the second contact faces 64. Because the first and second contact faces 60, 64 stand perpendicularly to one another, a belt pulley 28 with a high stiffness is provided. Thus additional metal inserts in the belt pulley 28 may be omitted. The belt pulley may thus be produced easily by injection molding and a corresponding molding tool.

The belt pulley 28 is attached to the threaded nut 26 via the fixing means 52. Both the first contact faces 60 and the ring bead 50 are raised relative to adjacent faces, so that the fixing forces applied by the fixing means 52 lead to compression of the belt pulley 28 in the region of the first contact faces 60. The belt pulley 28, made from a duroplastic material, absorbs compression forces better than tension forces, so high fixing forces are possible.

Figure 6:
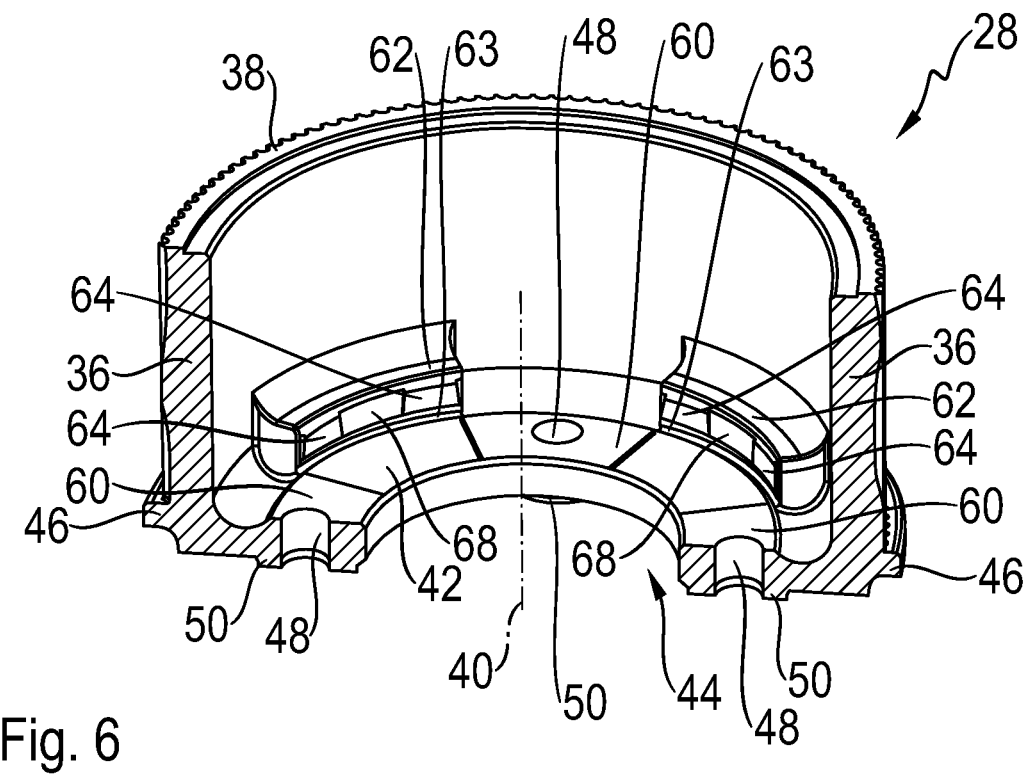

A belt pulley 28 according to a second embodiment is now described with reference to FIGS. 6 and 7; this substantially corresponds to the first embodiment so only the differences are described in detail below. The same components and those of equivalent function carry the same reference signs. FIG. 6 shows a sectional view through the belt pulley 28 from FIG. 5.

In contrast to the embodiment of the belt pulley 28 in FIGS. 4 and 5, the collar 46 arranged on the body 36 and protruding radially outwardly is not arranged flush with the fixing flange 42 but offset in the axial direction.

Also, two second contact faces 64 are provided on each axial extension 62, and spaced apart from one another in the circumferential direction by a connecting face 68. The second contact faces 64 of each extension 62 are raised relative to the connecting face 68 (FIG. 7).

Figure 7:
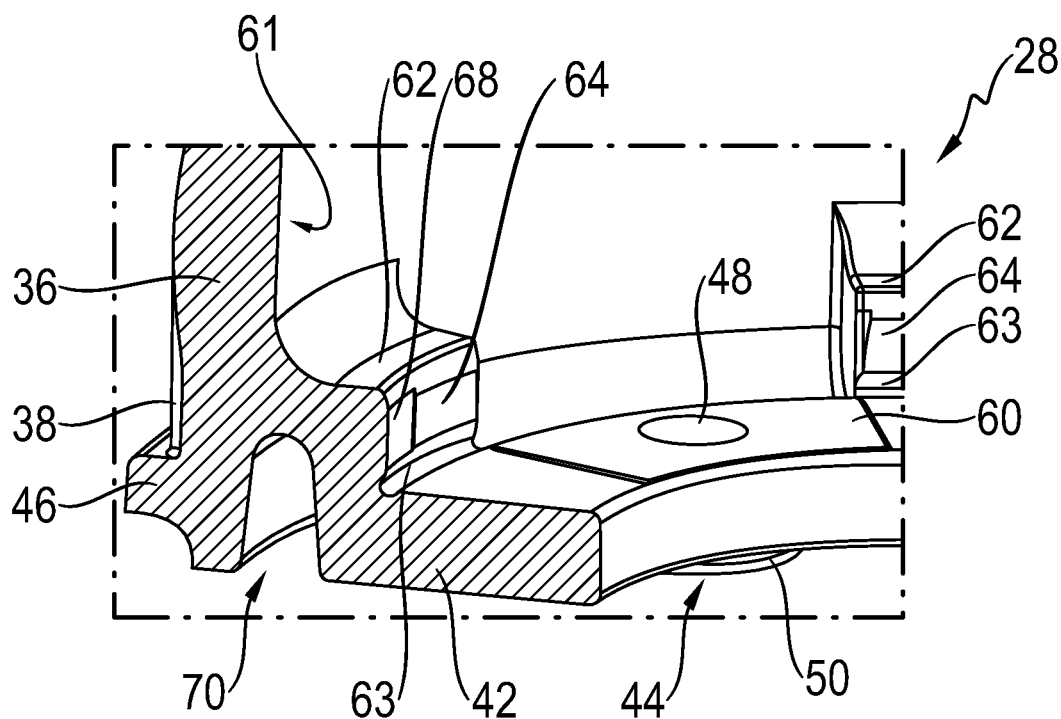

FIG. 7 shows the belt pulley 28 in an axial sectional view along the central axis 40 and through an axial extension 62. The belt pulley 28 is shown in the region of an axial extension 62.

In contrast to the first embodiment, each extension 62 has an axial cutout 70. The cutout 70 is designed such that the wall thickness of the belt pulley 28 in the region of the extension 62 substantially corresponds to the wall thickness of the belt pulley 28 in the region of the fixing flange 42 and in the region of the body 36.

In the embodiment of FIG. 7, the axial extension 62 is thus formed step-like in axial section through the extension 62.

In other words, the axial extension 62 has one portion parallel to a radial plane and one perpendicular to the radial plane, i.e. in the axial direction. The circumferential groove 63 is arranged here at the transition of the fixing flange 42 into the axial portion of the extension 62.

Evidently, the various features of both embodiments may be combined with each other arbitrarily. In particular, the features listed as differences from the second embodiment are independent and may also be present in various fashions in the first embodiment.

For example, the first embodiment may also have a corresponding cutout 70.

The invention claimed is:

1. A belt pulley for a gear mechanism, with a hollow cylindrical body (36) and a disc-like fixing flange (42), the body (36) having opposite first and second axial end faces and a cylindrical inner casing surface (61) extending axially between the first and second axial end faces, wherein the fixing flange (42) is molded onto one of the first and second axial end faces of the body (36), protrudes radially inward and has a central cutout (44), wherein the fixing flange (42) has at least one first contact face (60) on its inside and the body (36) has at least one second contact face (64) on an inside of the cylindrical body, wherein the first contact face (60) and the second contact face (64) are offset to one another in the circumferential direction relative to a central axis (40) of the body (36).

2. The belt pulley as claimed in claim 1, wherein viewed in the axial direction, all first contact faces (60) and all second contact faces (64) lie in different circumferential segments (66) which do not overlap.

3. The belt pulley as claimed in claim 1 or 2, wherein the at least one second contact face (64), or all second contact faces (64) in the case of several second contact faces (64), stands/stand perpendicularly to a plane in which the at least one first contact face (60), or all first contact faces (60) in the case of several first contact faces (60), lies/lie.

4. The belt pulley as claimed in claim 1, wherein the at least one second contact face (64) is a cylinder surface portion and runs parallel to the cylindrical inner casing surface (61) of the body (36).

5. The belt pulley as claimed in claim 1, wherein the at least one first and/or at least one second contact face (60, 64) are/is raised relative to adjacent faces.

6. The belt pulley as claimed in claim 5, wherein the at least one second contact face (64) is present on a step-like molded-on extension (62) of the cylindrical inner casing surface (61) of the body (36).

7. The belt pulley as claimed in claim 1, wherein several first contact faces (60) and several second contact faces (64) are present, wherein the several first contact faces (60) are spaced apart from one another and the several second contact faces (64) are spaced apart from one another, in each case circumferentially.

8. The belt pulley as claimed in claim 6, wherein several molded-on extensions (62) are provided which are spaced apart from one another in the circumferential direction and have at least one second contact face (64).

9. The belt pulley as claimed in claim 6, wherein the extension (62) lies at a transition between the body (36) and the fixing flange (42), and a circumferential groove (63) is provided at the transition between the radial inside of the extension (62) and the fixing flange (42).

10. The belt pulley as claimed in claim 6, wherein on the end face of the fixing flange (42) facing away from the body (36), in the region of the extension (62), at least one axial cutout (70) is provided which extends into the extension (62).

11. The belt pulley as claimed in claim 1, wherein at least one fixing opening (48) is provided on the fixing flange (42), and a protruding ring bead (50) which surrounds the fixing opening (48) and ends in a contact face (58) for a fixing means (52) is provided on the end face of the fixing flange (42) facing away from the body (36), wherein the circumferential face of the ring bead (50) forms an outer face of a truncated cone.

12. The belt pulley as claimed in claim 11, wherein each fixing opening (48) ends in the first contact face (60).

13. The belt pulley as claimed in claim 1, wherein the body (36) has a toothing (38) on a cylindrical outer casing surface, the cylindrical outer casing surface being opposite the cylindrical inner casing surface.

14. A steering gear for a vehicle, comprising:
 a threaded nut (26); and
 a belt pulley (28) having a hollow cylindrical body (36) and a disc-like fixing flange (42) that is molded onto an axial end of the body (36), protrudes radially inward and has a central cutout (44), an inside of the fixing flange (42) having at least one first contact face (60), an inside of the body (36) having at least one second contact face (64), the at least one first contact face (60) and the at least one second contact face (64) being offset to one another in the circumferential direction relative to a central axis (40) of the body (36), the belt pulley (28) being placed on the threaded nut (26) and attached thereto such that the threaded nut (26) lies on the first and second contact faces (60, 64).

15. The steering gear as claimed in claim 14, wherein the at least one first contact face (60) includes a plurality of first contact faces (60) and/or the at least one second contract face (64) includes a plurality of second contact faces (64), the threaded nut (26) lying on each of the first and second faces (60, 64).

16. The belt pulley as claimed in claim 4, wherein the at least one second contact face (64) and the cylindrical inner casing surface (61) both face toward the central axis (40).

17. The belt pulley as claimed in claim 16, wherein the at least one first contact face (60) is transverse to the central axis.

18. A steering gear for a vehicle, the steering gear comprising the belt pulley (28) of claim 1.

* * * * *